United States Patent
Osten

(10) Patent No.: US 8,584,015 B2
(45) Date of Patent: Nov. 12, 2013

(54) PRESENTING MEDIA CONTENT ITEMS USING GEOGRAPHICAL DATA

(75) Inventor: Robert Van Osten, Campbell, CA (US)

(73) Assignee: Apple Inc., Cupertino, CA (US)

( * ) Notice: Subject to any disclaimer, the term of this patent is extended or adjusted under 35 U.S.C. 154(b) by 257 days.

(21) Appl. No.: 13/110,863

(22) Filed: May 18, 2011

(65) Prior Publication Data

US 2012/0096361 A1    Apr. 19, 2012

Related U.S. Application Data

(60) Provisional application No. 61/394,767, filed on Oct. 19, 2010.

(51) Int. Cl.
    *G06F 3/00*    (2006.01)
(52) U.S. Cl.
    USPC ............ 715/731; 715/730; 715/202; 701/400
(58) Field of Classification Search
    USPC .......................... 715/731, 730, 202; 701/400
    See application file for complete search history.

(56) References Cited

U.S. PATENT DOCUMENTS

| | | | |
|---|---|---|---|
| 5,727,129 A | 3/1998 | Barrett |
| 5,812,128 A | 9/1998 | Sterling |
| 5,818,437 A | 10/1998 | Grover |
| 5,880,722 A | 3/1999 | Brewer |
| 6,018,774 A | 1/2000 | Mayle |
| 6,160,553 A | 12/2000 | Robertson |
| 6,249,316 B1 | 6/2001 | Anderson |
| 6,339,429 B1 | 1/2002 | Schug |
| 6,374,260 B1 | 4/2002 | Hoffert |
| 6,408,301 B1 | 6/2002 | Patton |
| 6,437,797 B1 | 8/2002 | Ota |
| 6,490,370 B1 | 12/2002 | Krasinski |
| 6,542,936 B1 | 4/2003 | Mayle |
| 6,545,687 B2 | 4/2003 | Scott |
| 6,700,612 B1 | 3/2004 | Anderson |
| 6,734,909 B1 | 5/2004 | Terane |
| 6,871,231 B2 | 3/2005 | Morris |
| 6,904,160 B2 | 6/2005 | Burgess |
| 6,912,327 B1 | 6/2005 | Hori |

(Continued)

FOREIGN PATENT DOCUMENTS

| | | |
|---|---|---|
| EP | 0576030 | 12/1993 |
| EP | 1283482 | 2/2003 |

(Continued)

OTHER PUBLICATIONS

Naaman et al., Adventures in Space and Time: Browsing Personal Collections of Geo-Referenced Digital Photographs, Technical Report. Stanford., 2004.

(Continued)

*Primary Examiner* — Patrick Riegler
(74) *Attorney, Agent, or Firm* — Wong, Cabello, Lutsch, Rutherford & Brucculeri, LLP

(57) ABSTRACT

Systems and techniques are disclosed for generating a geographically based slideshow of a user's digital media items such as photos or videos. A slideshow framework receives user-specified digital images, ordering them according to time of capture, organizing the ordered images into groups, each group corresponding to a different geographical region, and generating a slideshow of the user-specified images using maps of the different geo-graphical regions and visual transitions between the different geographical regions.

31 Claims, 6 Drawing Sheets

(56) References Cited

U.S. PATENT DOCUMENTS

| | | |
|---|---|---|
| 6,919,910 B2 | 7/2005 | Chang |
| 7,020,848 B2 | 3/2006 | Rosenzweig |
| 7,146,576 B2 | 12/2006 | Chang |
| 7,148,990 B2 | 12/2006 | Atkins |
| 7,162,488 B2 | 1/2007 | DeVorchik |
| 7,203,367 B2 | 4/2007 | Shniberg |
| 7,243,101 B2 | 7/2007 | Itou |
| 7,362,919 B2 | 4/2008 | Das |
| 7,437,005 B2 | 10/2008 | Drucker |
| 7,474,801 B2 | 1/2009 | Teo |
| 7,555,165 B2 | 6/2009 | Luo |
| 7,557,818 B1 | 7/2009 | Ubillos |
| 7,629,984 B2 | 12/2009 | Reid |
| 7,663,671 B2 | 2/2010 | Gallagher et al. |
| 7,680,340 B2 | 3/2010 | Luo |
| 7,707,517 B2 | 4/2010 | Bier |
| 7,747,074 B2 | 6/2010 | Yamakado |
| 7,796,779 B1 | 9/2010 | Strong |
| 7,839,420 B2 | 11/2010 | Ubillos |
| 7,978,936 B1 | 7/2011 | Casillas |
| 8,013,874 B2 | 9/2011 | Reid |
| 8,121,358 B2 | 2/2012 | Weng |
| 8,200,025 B2 | 6/2012 | Woodbeck |
| 8,200,669 B1 | 6/2012 | Iampietro |
| 2001/0022621 A1 | 9/2001 | Squibbs |
| 2001/0056434 A1 | 12/2001 | Kaplan |
| 2002/0000998 A1 | 1/2002 | Scott |
| 2002/0040375 A1 | 4/2002 | Simon |
| 2002/0051262 A1 | 5/2002 | Nuttall |
| 2002/0107973 A1 | 8/2002 | Lennon |
| 2002/0109728 A1 | 8/2002 | Tiongson |
| 2002/0143762 A1 | 10/2002 | Boyd |
| 2003/0076322 A1 | 4/2003 | Ouzts |
| 2003/0084087 A1 | 5/2003 | Berry |
| 2004/0205633 A1 | 10/2004 | Martinez |
| 2004/0218894 A1 | 11/2004 | Harville et al. |
| 2005/0063613 A1 | 3/2005 | Casey |
| 2005/0078174 A1 | 4/2005 | Casey |
| 2005/0091596 A1 | 4/2005 | Anthony |
| 2005/0091612 A1 | 4/2005 | Stabb |
| 2005/0108620 A1 | 5/2005 | Allyn |
| 2005/0206751 A1 | 9/2005 | Manico |
| 2005/0268279 A1 | 12/2005 | Paulsen |
| 2006/0044401 A1 | 3/2006 | Park |
| 2006/0066752 A1 | 3/2006 | Kelliher |
| 2006/0090359 A1 | 5/2006 | Bork |
| 2006/0114338 A1 | 6/2006 | Rothschild |
| 2006/0153460 A1 | 7/2006 | Kim |
| 2006/0155761 A1 | 7/2006 | Van |
| 2006/0187317 A1 | 8/2006 | Montulli |
| 2006/0224993 A1 | 10/2006 | Wong |
| 2006/0251339 A1 | 11/2006 | Gokturk |
| 2007/0035551 A1 | 2/2007 | Ubillos |
| 2007/0058932 A1 | 3/2007 | Wafler |
| 2007/0098266 A1 | 5/2007 | Chiu |
| 2007/0112852 A1 | 5/2007 | Sorvari |
| 2007/0115373 A1 | 5/2007 | Gallagher et al. |
| 2007/0127833 A1 | 6/2007 | Singh |
| 2007/0162298 A1 | 7/2007 | Melton |
| 2007/0188626 A1 | 8/2007 | Squilla |
| 2007/0223878 A1 | 9/2007 | Abe |
| 2008/0037826 A1 | 2/2008 | Sundstrom |
| 2008/0046840 A1 | 2/2008 | Melton |
| 2008/0086686 A1* | 4/2008 | Jing et al. ............... 715/706 |
| 2008/0094420 A1 | 4/2008 | Geigel |
| 2008/0104019 A1 | 5/2008 | Nath |
| 2008/0133938 A1 | 6/2008 | Kocher |
| 2008/0137848 A1 | 6/2008 | Kocher |
| 2008/0148152 A1 | 6/2008 | Blinnikka |
| 2008/0170781 A1 | 7/2008 | Woolgar |
| 2008/0174676 A1 | 7/2008 | Squilla |
| 2008/0219638 A1 | 9/2008 | Haot |
| 2008/0304755 A1 | 12/2008 | Xiao |
| 2008/0304808 A1 | 12/2008 | Newell |
| 2008/0310688 A1 | 12/2008 | Goldberg |
| 2009/0031246 A1 | 1/2009 | Cowtan |
| 2009/0067815 A1* | 3/2009 | Tsutsui ............... 386/117 |
| 2009/0089310 A1 | 4/2009 | Lara |
| 2009/0094518 A1 | 4/2009 | Lawther |
| 2009/0135274 A1 | 5/2009 | Kim |
| 2009/0148068 A1 | 6/2009 | Woodbeck |
| 2009/0150930 A1 | 6/2009 | Sherwin |
| 2009/0153492 A1* | 6/2009 | Popp ............... 345/173 |
| 2010/0066822 A1 | 3/2010 | Steinberg |
| 2011/0055284 A1 | 3/2011 | Wallace |
| 2011/0055749 A1 | 3/2011 | Wallace |
| 2011/0064317 A1 | 3/2011 | Ubillos |
| 2011/0196888 A1 | 8/2011 | Hanson |
| 2011/0200980 A1* | 8/2011 | Takahashi et al. ............ 434/365 |
| 2011/0208732 A1 | 8/2011 | Melton |
| 2011/0234613 A1 | 9/2011 | Hanson |
| 2011/0264923 A1 | 10/2011 | Kocher |
| 2012/0096361 A1 | 4/2012 | Osten |

FOREIGN PATENT DOCUMENTS

| | | |
|---|---|---|
| EP | 1566752 | 8/2005 |
| EP | 1729263 | 12/2006 |
| EP | 1796099 | 6/2007 |
| JP | 9027937 | 1/1997 |
| JP | 2002259410 | 9/2002 |
| JP | 2008131330 | 6/2008 |
| JP | 2008146191 | 6/2008 |
| KR | 2009003550 A | 1/2009 |
| WO | 0175646 | 10/2001 |
| WO | 2005001658 | 1/2005 |
| WO | 2005001714 | 1/2005 |
| WO | 2008079750 | 7/2008 |

OTHER PUBLICATIONS

Toyama et al., Geographic location tags on digital images, Proceedings of the eleventh ACM international conference on Multimedia, Session: Managing images, pp. 156-166, 2003.

Arnaud, Maetz, Authorized Officer, European Patent Office, PCT International Application No. PCT/US2011/056887, filed Oct. 19, 2011, International Search Report, mailed Jan. 11, 2012, 12 pages.

Jang, J., "A Smart Clustering Management for Concurrent Digital Photos Using EXIF Medadata," Jan. 1, 2008, Graphics Application Lab, Pusan National University, 13 pages.

Mallery, Sam, "Apple's New Ilife'11," Oct. 21, 2010, B & H Insights, retrieved from the Internet on Jan. 2, 2012: URL:http://corriputers.bhinsights.com/content/apples-new-ilife-II.html, 3 pages.

Perez, Luis, "iPhoto 09 Basics," Aug. 9, 2009, Retrieved from the Internet on Sep. 22, 2009: URL:http://etc.usf.edu/te_mac,/movies/pdf/iphoto09.pdf, 3 pages.

Adelman, Kenneth & Gabrielle, California Coastal Protection Network, California Coastal Records Project—Aerial Photographs of the California Coastline, [online], Copyright 2002-2006 Kenneth & Gabrielle Adelman, , retrieved Jul. 5, 2007, 1 page.

Adelman, Kenneth and Gabrielle, 'California Coastal Records Project,' Photography and website, [online], Copyright 2002-2005 Kenneth & Gabrielle Adelman—Adelman@Adelman.com, retrieved Apr. 11, 2008, pp. 1-4.

Anonymous: 'Indexing and recall of capture events', Research Disclosure, Mason Publication, Hampshire, GB, vol. 422, No. 66, Jun. 1, 1999, XP007124469 ISSN: 0374-4353.

Brian K. Smith et al., Inquiry with imagery: historical archive retrieval with digital cameras, Proeedings of the seventh ACM international conference on Multimedia (Part 1), p. 405-408, Oct. 3-Nov. 5, 1999, Orlando, Florida, US.

Cato, 'Digital Camera with Global Positioning Satellite to Record Location with Image', IBM Technical Disclosure, Sep. 1, 1998.

Chinese Notification of the First Office Action (with English translation) for Application No. 200780051294.9 dated Feb. 6, 2012, 9 pages.

Hewagamage, K.P. et al., "Augmented Album: situation-dependent system for a personal digital video/image collection"; Multimedia and Expo, 2000. ICME 2000. 2000 IEEE International Conference

(56) References Cited

OTHER PUBLICATIONS on New York, NY, USA, Jul. 30-Aug. 2, 2000, Piscataway, NJ, USA, IEEE, US, vol. 1, Jul. 30, 2000, pp. 323-326.

International Search Report and Written Opinion received in corresponding PCT Application No. PCT/US2007/087660, dated Jul. 30, 2008.

International Search Report and Written Opinion received in corresponding PCT Application No. PCT/US2008/056656, dated Aug. 1, 2008.

O'Hare et al., My digital photos: where and when?, ACM Multimedia 2005—13th ACM International Conference on Multimedia 2005, Nov. 6-12, 2005, Singapore.

Sony GPS tracker for photographers, Aug. 2, 2006.

Vailaya, A., Figueiredo, M. A. T., Jain, A. K., and Zhang, H.-J. 2001, "Image Classification for Content-Based Indexing," IEEE Trans. Image Process, 10, 1 117-130.

\* cited by examiner

PRESENTING MEDIA CONTENT ITEMS USING GEOGRAPHICAL DATA

CROSS-REFERENCE TO RELATED APPLICATIONS

This application claims the benefit of U.S. Provisional Application No. 61/394,767 titled "Presenting Media Content Items Using Geographical Data," which was filed on filed Oct. 19, 2010, and which is incorporated herein by reference in its entirety.

BACKGROUND

Digital photography and digital videography have simplified taking, viewing, storing, and reproducing media content such as still images and video. Photographs can be taken either using high-end equipment such as digital single lens reflex (SLR) cameras, low resolution cameras including point-and-shoot cameras and cellular telephone devices with suitable capabilities. Video can be taken either using high-end professional equipment, hand held cameras such as a camcorders, digital video cameras, and cellular telephone devices with suitable capabilities. In either case, a geographical location (e.g., a pair of latitude and longitude coordinates) at which a photo or video was captured can be recorded, either by the image capture device itself or potentially a separate device such as a Global Positioning System (GPS) device, and associated with the digital photo or video. Once captured, digital photos and video clips can be transferred from one location to another location such as from one data storage device to another data storage device, or from one location on a data storage device to another location on a data storage device.

Software applications or utilities can be used to store, display, and edit digital media content obtained from a camera, video camera, or any other electronic image in a digital format. Such software applications provide a user in possession of a large repository of digital media content with the capabilities to organize, view, and edit digital photographs and video clips.

SUMMARY

This document describes technology for generating a geographically based slideshow of digital media items such as photos or videos.

In one or more implementations, a method may be implemented to receive user-specified digital images, order the images according to time of capture, organize the ordered images into groups, each group corresponding to a different geographical region, and generate a slideshow of the user-specified images using maps of the different geographical regions and visual transitions between the different geographical regions. The geographical regions, for example, may be one or more of a neighborhood, a city, a county, a state, and a country. The method may further organize the images into groups based on a reverse geo-code lookup from geographical place of capture data associated with the images. If a reverse geo-code lookup for a particular image results in no associated geographical region, the method may organize the particular image into a group where the time of capture associated with the particular image is within a time of capture range for images in the group. The method may further organize an image into a group when the geographical distance from the image is near an average geographical range of previous images within a group, or if the geographical distance from an image is not near an average geographical range, the image may be organized into a new group. The method may further combine the groups when geographical regions overlap and separate the images within a group into subgroups. The subgroups may correspond to an area of interest or place of interest associated with a geographical region and may be displayed on a corresponding map. Names may be associated with each group and subgroup based on reverse geo-code lookup information and a quantity of images corresponding to the reverse geo-code lookup information. The visual transitions between the maps may be based on a direction of travel, type of terrain, or distance between the geographical regions. The method may further generate a title screen for the slideshow. The title screen may include a globe of the earth and an indication of all the geographical regions that will be represented in the slideshow.

According to another implementation, the described subject matter can also be implemented in a computer program product, tangibly embodied in a non-transitory computer-readable medium, configured to cause one or more data processing apparatuses to perform operations that include ordering user-specified digital images according to time of capture, organizing the ordered images into groups, each group corresponding to a different geographical region, and generating a slideshow of the user-specified images using maps of the different geographical regions and visual transitions between the different geographical regions. The geographical regions, for example, may be one or more of a neighborhood, a city, a county, a state, and a country. The computer program product may further cause a data processing apparatus to organize the images into groups based on a reverse geo-code lookup from geographical place of capture data associated with the images. If a reverse geo-code lookup for a particular image results in no associated geographical region, the particular images may be organized into a group where the time of capture associated with the particular image is within a time of capture range for images in the group. An image may further be organized into a group when the geographical distance from the image is near an average geographical range of previous images within a group, or if the geographical distance from an image is not near an average geographical range, the image may be organized into a new group. Groups may be combined when geographical regions overlap and images may be separated within a group into subgroups. The subgroups may correspond to an area of interest or place of interest associated with a geographical region and may be displayed on a corresponding map. Names may be associated with each group and subgroup based on reverse geo-code lookup information and a quantity of images corresponding to the reverse geo-code lookup information. The visual transitions between the maps may be based on a direction of travel, type of terrain, or distance between the geographical regions. The slideshow may further have a title screen that includes a globe of the earth and an indication of all the geographical regions that will be represented in the slideshow.

According to another implementation, the described subject matter can also be implemented in a computer system or apparatus. A system of one or more computers can be configured to cause one or more data processing apparatuses to perform operations that include ordering user-specified digital images according to time of capture, organizing the ordered images into groups, each group corresponding to a different geographical region, and generating a slideshow of the user-specified images using maps of the different geographical regions and visual transitions between the different geographical regions. The geographical regions, for example, may be one or more of a neighborhood, a city, a county, a state, and a country. The computer system may further organize the images into groups based on a reverse geo-code lookup from geographical place of capture data associated with the images. If a reverse geo-code lookup for a particular image results in no associated geographical region, the particular images may be organized into a group where the time of capture associated with the particular image is within a time of capture range for images in the group. An image may further be organized into a group when the geographical distance from the image is near an average geographical range of previous images within a group, or if the geographical distance from an image is not near an average geographical range, the image may be organized into a new group. Groups may be combined when geographical regions overlap and images may be separated within a group into subgroups. The subgroups may correspond to an area of interest or place of interest associated with a geographical region and may be displayed on a corresponding map. Names may be associated with each group and subgroup based on reverse geo-code lookup information and a quantity of images corresponding to the reverse geo-code lookup information. The visual transitions between the maps may be based on a direction of travel, type of terrain, or distance between the geographical regions. The slideshow may further have a title screen that includes a globe of the earth and an indication of all the geographical regions that will be represented in the slideshow.

The details of one or more implementations of the subject matter of this specification are set forth in the accompanying drawings and the description below. Other features, aspects and potential advantages will be apparent from the description and drawings, and from the claims.

DESCRIPTION OF DRAWINGS

Like reference symbols in the various drawings indicate like elements.

DETAILED DESCRIPTION

Figure 1:
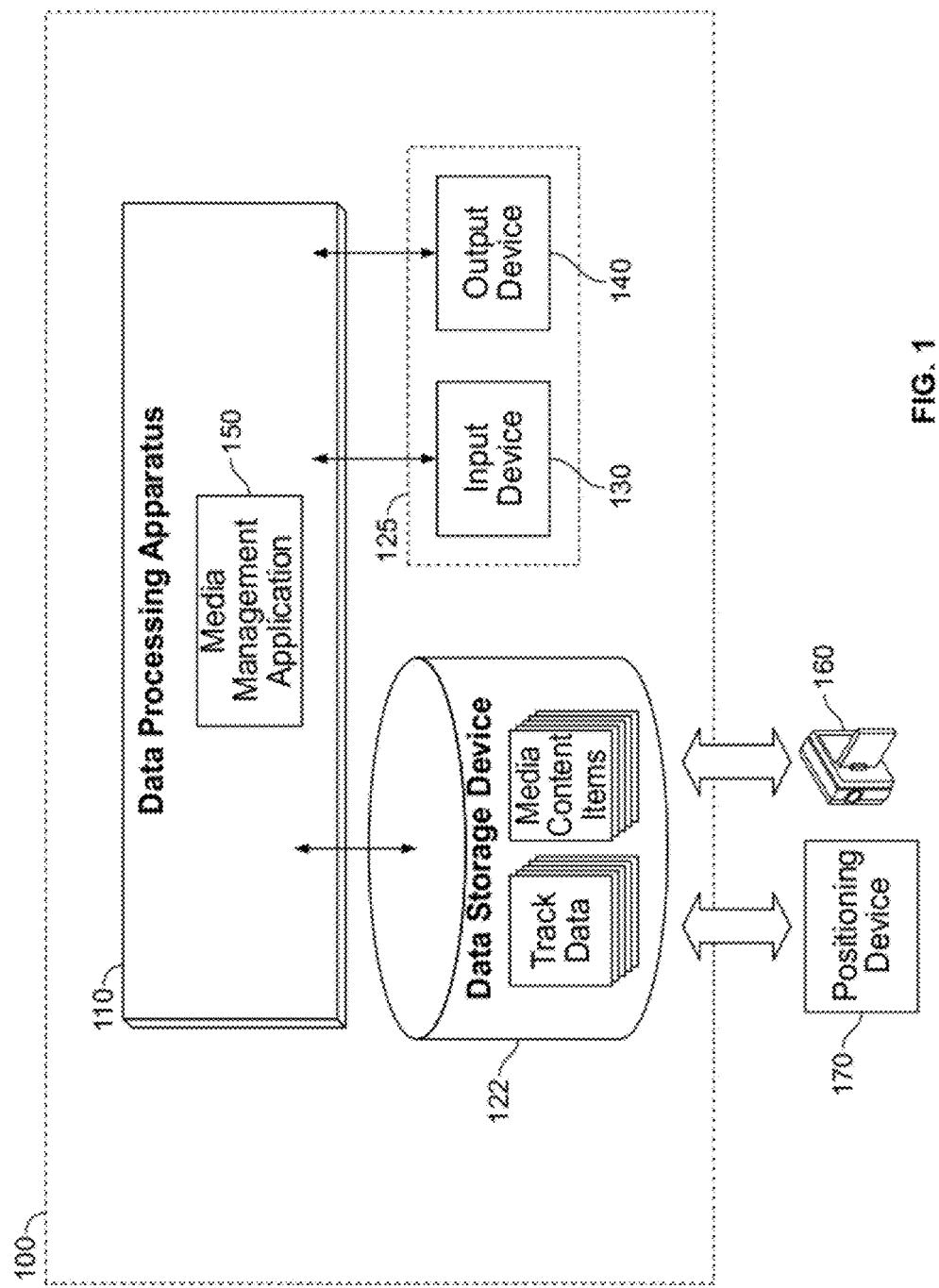
FIG. 1 is a schematic that shows an example of a system for displaying media content items using geographical data.

FIG. 1 is a schematic that shows an example of a system 100 for associating and displaying media content items, such as video segments and digital images, with geographical data. The system 100 includes processor electronics 110, such as a data processing apparatus, communicatively connected to a data storage device 122 and to one or more user interface devices 125. The user interface devices 125 can include one or more input devices 130 (e.g. a mouse, a keyboard, etc.), and one or more output devices 140 (e.g. a display device, speakers, etc.). The data processing electronics 110 can also operate a media management application 150.

Media content items can be stored on the data storage device 122. For example, media content items stored on media capture device 160 (e.g. a digital video camera, digital camera etc.) can be uploaded to the data storage device 122 and displayed in the media management application 150. The media content items can be uploaded with time coordinates identifying a time of capture of the respective media content items by the media capture device 160. For a video segment, the time of capture can be associated with a reference frame, e.g. the time of capture of the first frame of the video segment. In some examples, the media content items can be uploaded with corresponding geographical data identifying a location where each media content item was captured. For a digital photograph, a position coordinate (e.g. a global positioning system ("GPS") coordinate), identifying where the picture was captured by media capture device 160, can be uploaded to the data storage device 122. For a video segment, a positioning coordinate for a reference frame (e.g. the first frame) in a video segment can be captured by the media capture device 160 and uploaded to the data storage device 122 with the video segment.

Also, geographical track data, e.g. in the form of track files, can be stored on the data storage device 122. For example, track data can be uploaded from a positioning device 170 to the data storage device 122. Example positioning devices include a GPS device, a GPS data logger, or a GPS dongle. Geographical track data can include a series of position coordinates identifying locations along a track and corresponding time coordinates that represent times when the position coordinates were recorded by the positioning device 170. Based on the geographical track data, a track path can be determined for a path of travel. For example, a user can have a positioning device 170 such as a GPS dongle that captures geographical track data for a path traveled by the user as the user captures media content items with a media capture device 160. The geographical track data for the path traveled by the user can be uploaded to the data storage device 122 and the media application 150 can display a track path on a map in a user interface corresponding to the path traveled by the user. In some examples, a media capture device can simultaneously capture both video content and track data. The video content and the track data can be uploaded to the data storage device 122 from the media capture device.

Also, the media management application 150 can determine a location on the track path for media content items, can determine a location of capture on the track path for frames of a video segment, and can locate a frame in a video segment for a given location on the track path. The media management application 150 can display the media content items in a display window while displaying a map with the track path corresponding to the media content items. For example, the media management application 150 can display a presentation of multiple media content items (or of a video segment) captured along a track path while displaying a location marker at a location on the track path associated with the location of capture of the displayed media content item (or of the displayed frame of the video segment).

Figure 2:
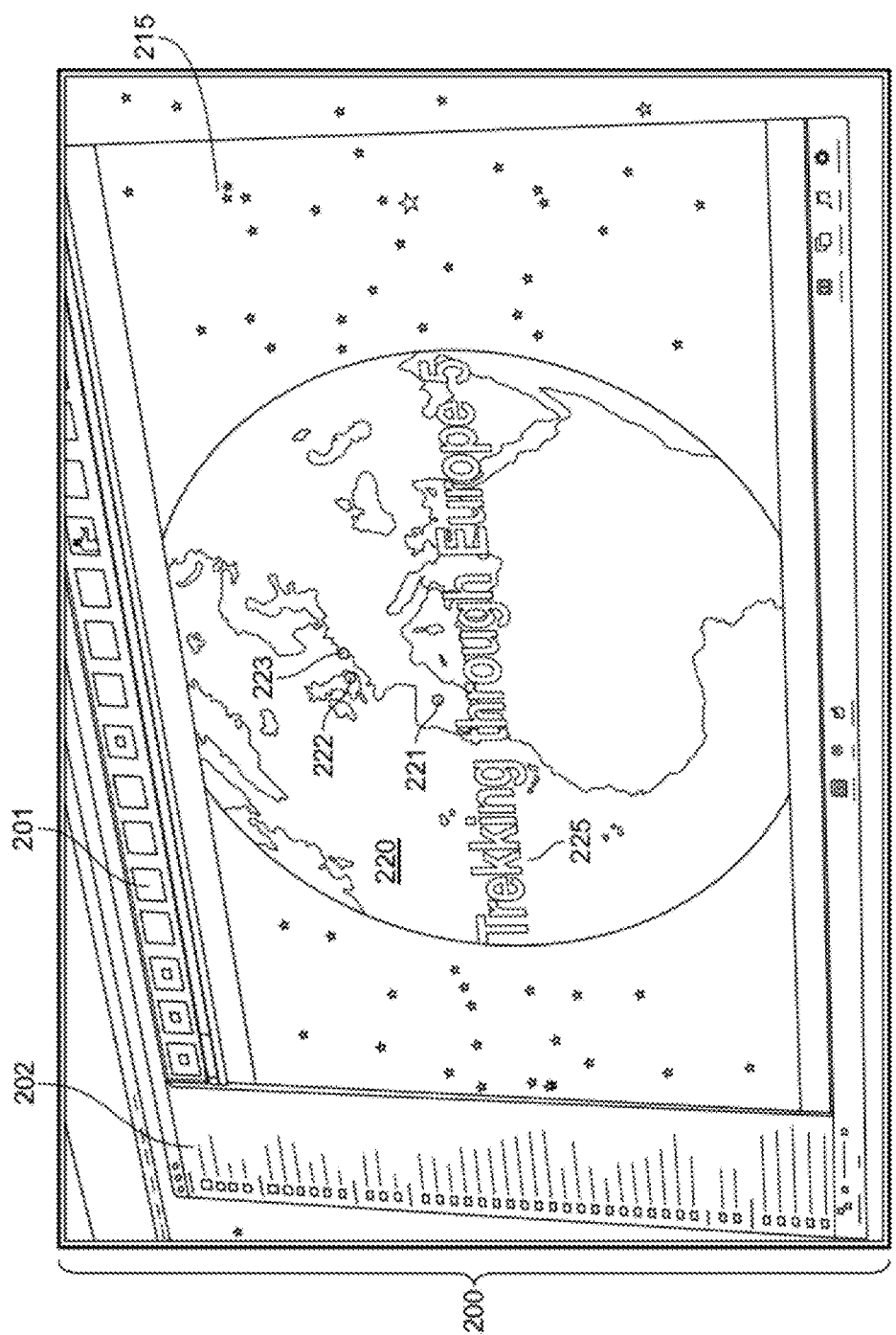
FIGS. 2-5 are exemplary screenshots of a user interface.

FIGS. 2-5 show screenshots of an exemplary user interface 200 for displaying one or more media content items (e.g., either photos or video clips) using geographic data, for example, an associated track path and maps corresponding to locations at which the media items where captured. The user interface 200 can be displayed in a display device operatively coupled to a data processing apparatus (e.g., a desktop computer, a notebook computer, or a touch-based apparatus such as an Apple iPhone®, iPad® or iPod Touch®). The following discussion of the user interface 200 is within the context of displaying digital photos and digital video content but also applies to other media content items (e.g., audio, graphics, text, etc.). The user interface 200 has a media display window 215 for displaying a media presentation such as photos, video clips, graphics (e.g., the virtual globe and text as shown in FIG. 2) or a series of media content items such as a slideshow; a slideshow window 201 for displaying thumbnail images of successive slides that, when displayed sequentially, make-up the current slideshow; and a media content window 202 that displays a list of selectable media files.

In the example shown in FIGS. 2-5, the user has opted to have the media management application 150 generate and display a slideshow of photos that the user took while trekking through Europe. To do so, the user invokes a slideshow framework within the media management application 150, and then specifies (e.g., by selecting them in the media content window 202) a subset of available photos that the user desires to be included in the slideshow. The slideshow window 201 updates as appropriate to display thumbnail images of the selected photos, potentially with maps and other graphics interspersed either as standalone slides or as backgrounds (or other supplementary graphics) that will be displayed in concurrently with one or more of the user-specified photos.

Once the user has settled on the subset of photos (and/or other media content items) that are to make-up the slideshow, the user can instruct the media management application 150 to start the slideshow, in which case the slideshow framework can change the display (that is, switch to the next slide in the slideshow) based on default and/or user-supplied parameters such as transitions to be used between slides (e.g., wipes, fades or the like) and/or timing for switching from one slide to the next.

In the example of FIGS. 2-5, the slideshow framework has started the slideshow by displaying an image of a virtual globe representing the planet Earth suspended in space. The virtual globe is oriented such that at least some (and typically all) of the different cities or other locations at which the slides in the slideshow were captured are visible, with each such city or location being represented by a visual marker, such as a push-pin. Here, the slideshow includes three pushpins 221, 222, 223, corresponding to the three cities (Madrid, Amsterdam, London) that are collectively represented by the photos comprising the slideshow. In general, each pushpin corresponds to at least one (and typically multiple) media item that was captured at that location.

After displaying the virtual globe for a predetermined time (or in response to manual input if in manual slideshow mode) to give the viewer time to absorb an overview of the overall slideshow that is about to be presented, and thus an overview of the user's trip, the slideshow framework zooms into a pushpin-indicated city or area (in this case, the pushpin 221 corresponding to Madrid) that corresponds to the temporally first-in-time city for which photos in the slideshow were captured. In other words, the slideshow framework inspects a time/date stamp for each photo in the slideshow (typically carried in the metadata of each digital photo) and, orders them from the first-in-time captured to the last-in-time captured, groups them according to predefined city or area designations, and then displays the photos in order of capture time.

Figure 3:
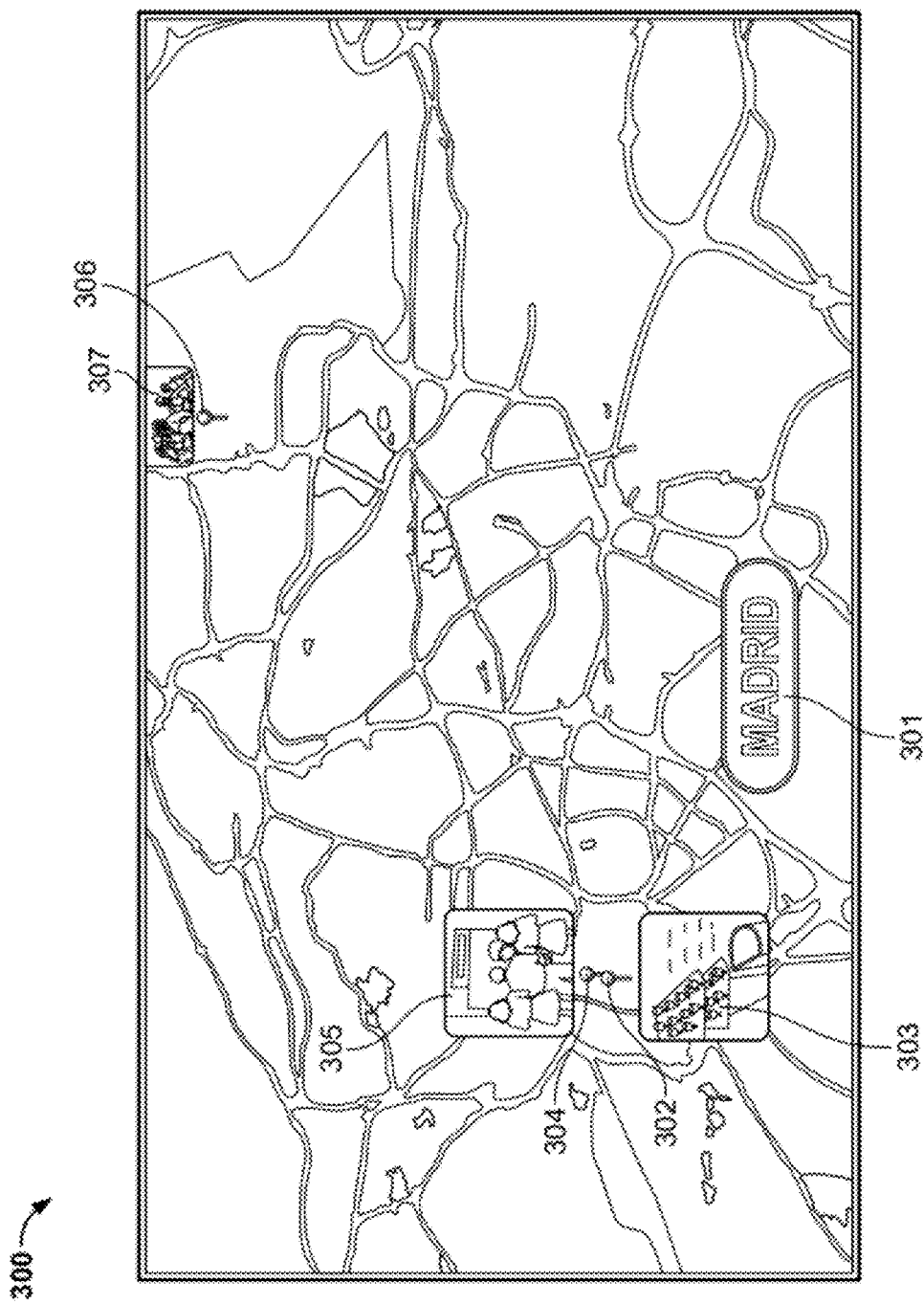

As shown in FIG. 3, the first city in this slideshow is Madrid, meaning that, based on the time/date stamps of the photos designated by the user to be part of the slideshow, those photos that were captured at latitude/longitude coordinates generally corresponding to Madrid were captured before the other photos in the slideshow. Within each city or area, the associated slideshow photos can be sub-grouped (based on the geographical place-of-capture data associated with each photo) into POIs (places of interest or, equivalently, points of interest) and/or AOIs (areas-of-interest), each of which can in turn be represented by a pushpin. As shown in FIG. 3, the slide presented as part of the slideshow is formed from a map 300 showing a portion of the greater Madrid area, a label 301 specifying the city represented by the map 300, and three pushpins 302, 304, 306, each corresponding to a different sub-grouping of one or more photos in the slideshow within the city classification of Madrid. In addition, each pushpin 302, 304, 306 corresponding to a sub-grouping of photos can have an associated thumbnail image 303, 305, 307 displayed adjacent to the pushpin. The thumbnail images 303, 305, 307 display thumbnail versions of one of the photos associated with that sub-grouping. The particular photo displayed in the thumbnail images 303, 305, 307 can either be a default choice (e.g., the first captured photo in that subgroup) or can be a user-specified choice.

Similar to how the slideshow framework first displayed a view of the Earth and then zoomed into the first city within the slideshow to present the view shown in FIG. 3, the slideshow framework would next (again, either automatically based on a predetermined time duration and/or in response to user input), the slideshow framework would next zoom into the pushpin corresponding to that AOI or POI at which the first photos in the current city (that is, Madrid) were captured, and then would display the actual photos, one after another based on time-of-capture order—using standard digital photo slideshow display and transition parameters.

In the example shown, pushpin 306, which corresponds to the AOI "Madrid Barajas International Airport," happens to be the first location in Madrid at which the user captured photos that also were designated for inclusion in the slideshow. As a result, the slideshow framework transitions from the view shown in FIG. 3 to that shown in FIG. 4, e.g., by displaying a zoom-like transition to present a closer view of pushpin 306, and concurrently displays a label 401 identifying that AOI. After that, the slideshow framework would display the actual photos associated with pushpin 306, then zoom back out, travel over the displayed map, zoom into the next pushpin (that is, the next AOI associated with Madrid for which the user designated photos to be included in the slideshow), successively display those photos, and so on, until the user's slideshow photos for each of the three Madrid AOIs were displayed.

Figure 5:
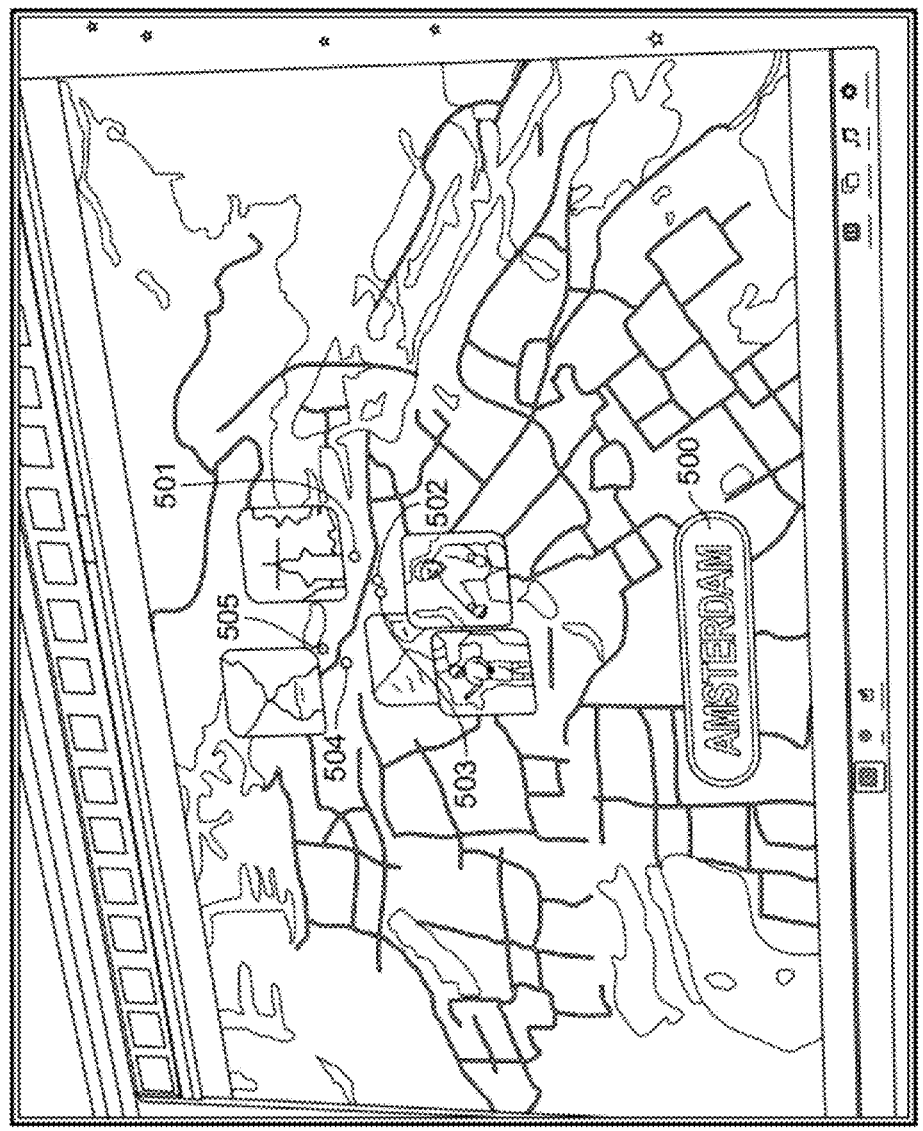

Once the slideshow framework has finished displaying the photos associated with the first city in the trip, the framework would perform similar zooming and panning to move onto the next city in the trip, in this example, Amsterdam. As shown in FIG. 5, the slideshow framework has determined that the designated slideshow photos include photos corresponding to five different AOIs and/or POIs within Amsterdam, each AOI/POI represented by its own pushpin 501-505 and thumbnail image, and the city of Amsterdam being identified by label 500. As explained above, the slideshow framework will then zoom into each AOI/POI, displayed the corresponding slideshow photos, and then transition to the next AOI/POI until all of the slideshow photos corresponding to pushpins 501-505 have been displayed.

The above process continues and performs similar iterations for each city (in this example, just one more—namely, London), and for each AOI/POI within each city, until all of the designated photos in the slideshow have been displayed, at which time the slideshow terminates. Further details are provided in connection with FIGS. 6, 7A and 7B, which include block diagrams and a flowchart depicting concepts and processes that can be used to accomplish the slideshow functions described above.

Figure 6:
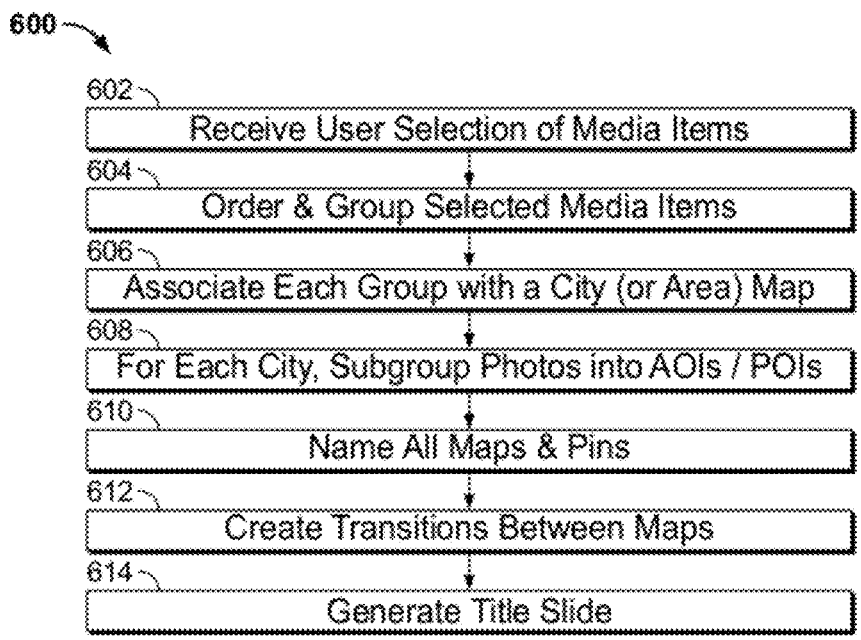
FIG. 6 is a flowchart of a process for generating a geographically based slideshow.

FIG. 6 is a flowchart of a process 600 that can be executed by a slideshow framework to generate a geographically based slideshow of a user's media content items (e.g., digital photos and/or video clips). At 602, the framework receives a user's selection of digital photos that the user desires to be part of a geographically based slideshow. A popular example would be photos and/or videos from a road trip or vacation photos.

Figure 7A:
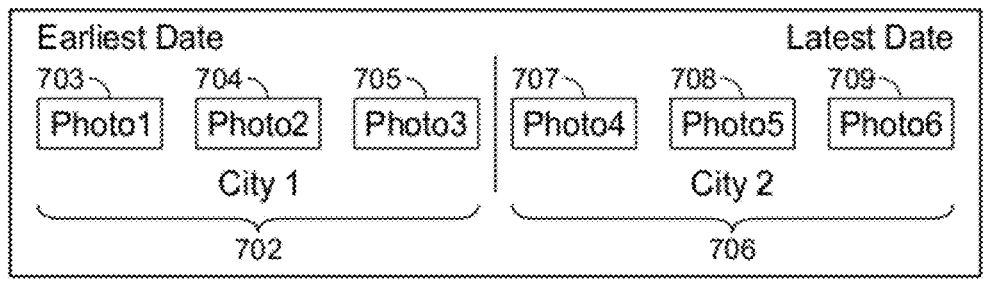
FIGS. 7A and 7B are block diagrams.

Next, at 604, the slideshow framework orders and groups the user-selected photos as follows:

- Order all selected photos by the capture date of the photo (either based on metadata associated with the photo or using a geographical location entered by the user)
- Perform a reverse geo-code lookup from the GPS coordinates associated with each photo to get the Country, State, City, Neighborhood, Area of Interest (AOI) and Place of Interest (POI) for each photo
- Separate the now date-ordered photos by city name or distance between the photos. If for a particular photo no city name is defined, or one could not be found one in the reverse geocode lookup, the date of the photo is inspected and if this date is within the average time span of the previous slideshow photos in the city, the photo under consideration will be included in the current city; otherwise, the photo under consideration will be deemed to correspond to the start of a new city.
- For each photo, determine its geographical distance from the average of all the previous photos in that city; if the photo under consideration is near the average range, deem the photo to be part of the current city; otherwise, the photo under consideration will be deemed to correspond to the start of a new city. An example of how the photos are grouped is shown in FIG. 7A.
- Once all of the slideshow photos have been grouped into separate cities, check whether any of those cities are overlapping or within a short distance of each other and, if so, combine them into one city. (This would be common if the user had captured photos at the edge of two cities or in two smaller, adjacent cities.)

Next, at 606, each separate city grouping is associated with a specific map, which will be displayed, along with pushpins, as an introductory slide for the city under consideration. In other words, each of these cities determined above will serve as a separate map in the slideshow theme.

Figure 7B:
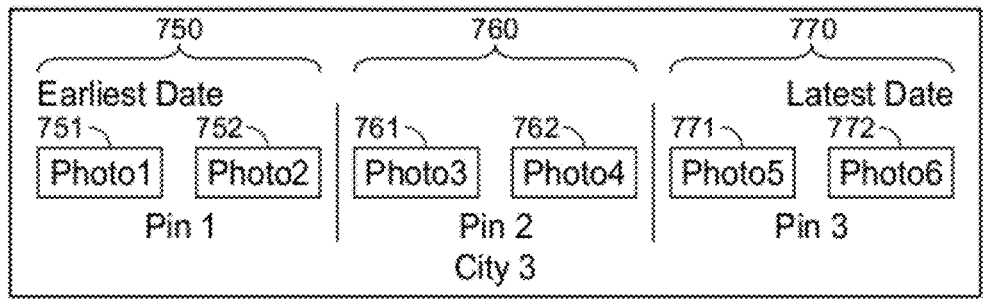

At 608, for each identified city, the framework subgroups the photos into different "Areas of Interests" and "Places of Interest" for that city. That is, for each of the cities or maps identified, the framework will go through and separate the photos into pushpin groups to be displayed on the corresponding map. To do so, the framework will go through all of the photos in a city under consideration and count up the number (quantity) if different AOIs and POIs for that city. The framework uses different threshold values for AOIs and for POIs. If, based on the count noted above, either the AOI or POI threshold is met, the framework will group the photos by that location type (AOI or POI). Otherwise, the photos will be grouped by distance. If the framework groups the photos by the AOI or POI, it simply goes through the list of photos in the city ordered by date and separates them by the AOI or POI name, similar to how the framework separated the photos by city name. If there are not enough AOIs or POIs in that city to meet the threshold(s), the framework will group the photos by location using the GPS location of each photo. The groupings are determined by the average distance between all the previous photos; if the new distance is too far from the previous photos it will be treated as a new pin. An example of how pins are grouped in a map is shown in FIG. 7B.

At 610, now that the framework has the photos grouped by city and pushpin photo grouped identified within that city, the framework goes through and names all the maps and pins. To choose the city name to represent all the pins on one map, the framework will first go through and find the most common city name; if there is not a city name with at least 75% of the photos corresponding to that name, the frameworks goes through all the photos and checks the state names, if there are at least 75% of the photos with the same state name, the framework will use the state name instead of a city name. If there are not at least 75% photos with the same state name, the framework will check the country name using the same method. If all those fail, the framework will go through and just find the city name that is most common. An example of a city label is shown in FIG. 5 at reference 500.

Figure 4:
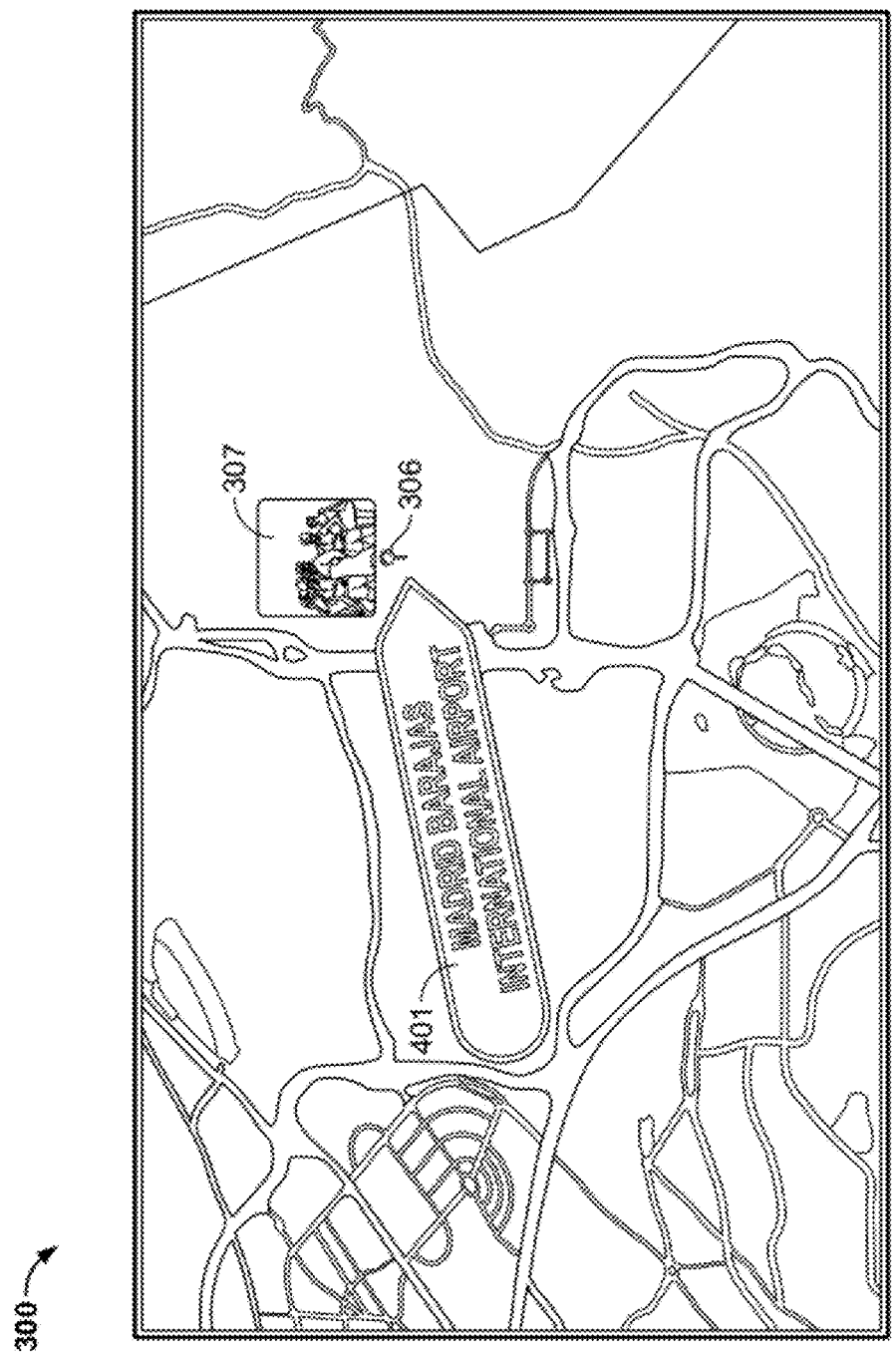

Once the framework has a city (or state) name for each map, the framework names each pin. To do so, the framework follows essentially the same steps as above to find the city name, but instead starts with the place of interest (POI) name, then goes to the area of interest (AOI), neighborhood, then city. If the pin label and the city label end up being the same name, the framework will not put a label on that pin. An example of a pin label is shown in FIG. 4 at reference 401.

Once the framework has all the maps, labels and photos sorted, the framework goes through and downloads (e.g., from a networked database) each map needed for the slideshow. Then, at 612, the framework creates visual transitions to display between each map to create a seamless viewing experience. For each map, the framework determines the direction of travel (e.g., North, South, East, West) that the user traveled from the current city to the next city. The framework then determines what type of terrain (e.g., water, dirt, rocks, grass, snow, etc.) should be displayed to visually connect the two maps. For example, if the slideshow is to proceed to the East, and the East side of the current map and the West side of the next map both have water at their edges, it means that the framework ideally should to create a water transition in between. If there is land and then water, the framework will transition, for example, from a beach to water. Going from land to land would just be a mixture of green or brown depending if the relevant locations are near parks, deserts, etc. Each of the visual map transitions is pre-blurred and stretched to give the illusion, while being displayed, that the viewer is traveling over a large distance. Based on the actual geographic distance between the two maps on either side of the transition, the framework will adjust the duration of the transition to give a more realistic feel. If the two maps are close enough to each other such that the framework can use an extra (actual) map to connect them and not have to download a lot extra map data, then the framework will use the real (actual) map to give a more realistic look (rather than the simulated, blurred and stretched map).

Next, at 614, the framework creates a title slide, for example, a globe of the earth with a user specified title for the slideshow. This globe will have markers of all the cities that will be represented in the slide-show, to give the user an overview of where they will visit.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a machine or computer readable medium. The machine or computer readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard (physical and/or virtual) and a pointing device—e.g., a mouse, a trackball, a stylus, or in the case of touch-based computing, one or more of the user's fingers—by which the user can provide input to the computer. Other kinds of devices can be used to provide for interaction with a user as well; for example, input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Particular implementations have been described in this document. Variations and enhancements of the described implementations and other implementations can be made based on what is described and illustrated in this document. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by one or more processes executing on a computer system, the method comprising:
   receiving a plurality of user-specified digital images, each image having an associated capture time;
   organizing the received images according to their respective capture times to form an ordered set of images;
   identifying one or more boundaries within the ordered set of images to define an ordered set of image groups, each group corresponding to a different geographical region;
   retrieving a map for each of the geographical regions; and
   generating a slideshow of the user-specified images, wherein the slideshow comprises:
      one or more slides for each image group, the one or more slides comprising the images for the image group,
      an introductory slide for each image group that includes the map for the geographical region corresponding to the image group and precedes the one or more slides for the image group, and
      a visual transition between each consecutive pair of image groups in the ordered set of image groups that visually connects the maps for the geographical regions corresponding to the image groups in the consecutive pair of image groups based, at least in part, on a type of terrain that is between the geographical regions corresponding to the consecutive pair of image groups.

2. The method of claim 1 wherein the different geographical regions are one or more of a neighborhood, a city, a county, a state, and a country.

3. The method of claim 1 wherein identifying one or more boundaries within the ordered set of images comprises:
   determining a geographical region associated with each image in the ordered set of images by performing a reverse geo-code lookup from geographical place of capture data associated with each image; and identifying the one or more boundaries based on the determined geographical regions.

4. The method of claim 3 wherein identifying one or more boundaries within the ordered set of images further comprises organizing a particular image into a group where the capture time associated with the particular image is within a capture time range for images in the group if the reverse geo-code lookup for the particular image results in no associated geographical region.

5. The method of claim 1 wherein identifying one or more boundaries within the ordered set of images comprises:
- determining a geographical distance from a capture location associated with a particular image in the ordered set of images under consideration to an average geographical location of one or more previous images within the ordered set of images; and
- identifying a boundary that defines a group that includes the particular image the one or more previous images when the geographical distance is less than a threshold value.

6. The method of claim 5 wherein identifying one or more boundaries within the ordered set of images further comprises identifying a boundary that separates the particular image and the one or more previous images into separate groups when the geographical distance is greater than the threshold value.

7. The method of claim 1 further comprising combining two or more of the groups when the geographical regions corresponding to the two or more groups overlap.

8. The method of claim 1 further comprising separating the ordered images within at least one group into a plurality of subgroups, wherein the subgroups correspond to at least one of an area of interest and a place of interest within the geographical region corresponding to the at least one group.

9. The method of claim 8 further comprising associating names with each group and subgroup, wherein the associated names are based at least in part on reverse geo-code lookup information obtained by using geographical place of capture data associated with each image and a quantity of images corresponding to the reverse geo-code lookup information.

10. The method of claim 1 wherein each visual transition is additionally based, at least in part, on a direction of travel and a distance between the geographical regions corresponding to the image groups in a consecutive pair of image groups.

11. The method of claim 1 further comprising generating a title screen for the slideshow, wherein the title screen comprises a globe that displays the geographical regions corresponding to each of the groups.

12. A computer program product, tangibly embodied in a non-transitory computer-readable medium, to cause one or more data processing apparatuses to perform operations comprising:
- organizing a plurality of user-specified digital images according to a respective capture time associated with each image to form an ordered set of images;
- identifying one or more boundaries within the ordered set of images to define an ordered set of image groups, each group corresponding to a different geographical region;
- retrieving a map for each of the geographical regions; and
- generating a slideshow of the user-specified images, wherein the slideshow comprises:
  - one or more slides for each image group, the one or more slides comprising the images for the image group,
  - an introductory slide for each image group that includes the map for the geographical region corresponding to the image group and precedes the one or more slides for the image group, and
  - a visual transition between each consecutive pair of image groups in the ordered set of image groups that visually connects the maps for the geographical regions corresponding to the image groups in the consecutive pair of image groups based, at least in part, on a type of terrain that is between the geographical regions corresponding to consecutive pair of image groups.

13. The computer program product of claim 12 wherein the different geographical regions are one or more of a neighborhood, a city, a county, a state, and a country.

14. The computer program product of claim 12 wherein identifying one or more boundaries within the ordered set of images comprises:
- determining a geographical region associated with each image in the ordered set of images by performing a reverse geo-code lookup from geographical place of capture data associated with each image; and
- identifying the one or more boundaries based on the determined geographical regions.

15. The computer program product of claim 14 wherein identifying one or more boundaries within the ordered set of images further comprises organizing a particular image into a group where the capture time associated with the particular image is within a capture time range for images in the group if the reverse geo-code lookup for the particular image results in no associated geographical region.

16. The computer program product of claim 12 wherein identifying one or more boundaries within the ordered set of images comprises:
- determining a geographical distance from a capture location associated with a particular image in the ordered set of images under consideration to an average geographical location of one or more previous images within the ordered set of images; and
- identifying a boundary that defines a group that includes the particular image and the one or more previous images when the geographical distance is less than a threshold value.

17. The computer program product of claim 16 wherein identifying one or more boundaries within the ordered set of images further comprises identifying a boundary that separates the particular image and the one or more previous images into separate groups when the geographical distance is greater than the threshold value.

18. The computer program product of claim 12 further comprising separating the ordered images within at least one group into a plurality of subgroups, wherein the subgroups correspond to at least one of an area of interest and a place of interest within the geographical region corresponding to the at least one group.

19. The computer program product of claim 18 further comprising associating names with each group and subgroup, wherein the associated names are based at least in part on reverse geo-code lookup information obtained by using geographical place of capture data associated with each image and a quantity of images corresponding to the reverse geo-code lookup information.

20. The computer program product of claim 12 wherein each visual transition is additionally based, at least in part, on a direction of travel and a distance between the geographical regions corresponding to the image groups in a consecutive pair of image groups.

21. The computer program product of claim 12 further comprising generating a title screen for the slideshow, wherein the title screen comprises a globe that displays the geographical regions corresponding to each of the groups.

22. A system comprising:
a processor; and
a computer-readable medium encoding instructions to cause the processor to perform operations comprising:
organizing a plurality of user-specified digital images according to a respective capture time associated with each image to form an ordered set of images;
identifying one or more boundaries within the ordered set of images to define an ordered set of image groups, each group corresponding to a different geographical region;
retrieving a map for each of the geographical regions; and
generating a slideshow of the user-specified images, wherein the slideshow comprises:
one or more slides for each image group, the one or more slides comprising the images for the image group,
an introductory slide for each image group that includes the map for the geographical region corresponding to the image group and precedes the one or more slides for the image group, and
a visual transition between each consecutive pair of image groups in the ordered set of image groups that visually connects the maps for the geographical regions corresponding to the image groups in the consecutive pair of image groups based, at least in part, on a type of terrain that is between the geographical regions corresponding to the consecutive pair of image groups.

23. The system of claim 22 wherein the different geographical regions are one or more of a neighborhood, a city, a county, a state, and a country.

24. The system of claim 22 wherein identifying one or more boundaries within the ordered set of images comprises:
determining a geographical region associated with each image in the ordered set of images by performing a reverse geo-code lookup from geographical place of capture data associated with each image; and
identifying the one or more boundaries based on the determined geographical regions.

25. The system of claim 24 wherein identifying one or more boundaries within the ordered set of images further comprises organizing a particular image into a group where the capture time associated with the particular image is within a capture time range for images in the group if the reverse geo-code lookup for the particular image results in no associated geographical region.

26. The system of claim 22 wherein identifying one or more boundaries within the ordered set of images comprises:
determining a geographical distance from a capture location associated with a particular image in the ordered set of images under consideration to an average geographical location of one or more previous images within the ordered set of images; and
identifying a boundary that defines a group that includes the particular image and the one or more previous images when the geographical distance is less than a threshold value.

27. The system of claim 26 wherein identifying one or more boundaries within the ordered set of images further comprises identifying a boundary that separates the particular image and the one or more previous images into separate groups when the geographical distance is greater than the threshold value.

28. The system of claim 22 further comprising separating the ordered images within at least one group into a plurality of subgroups, wherein the subgroups correspond to at least one of an area of interest and a place of interest within the geographical region corresponding to the at least one group.

29. The system of claim 28 further comprising associating names with each group and subgroup, wherein the associated names are based at least in part on reverse geo-code lookup information obtained by using geographical place of capture data associated with each image and a quantity of images corresponding to the reverse geo-code lookup information.

30. The system of claim 22 wherein each visual transition is additionally based, at least in part, on a direction of travel and a distance between the geographical regions corresponding to the image groups in a consecutive pair of image groups.

31. The system of claim 22 further comprising generating a title screen for the slideshow, wherein the title screen comprises a globe that displays the geographical regions corresponding to each of the groups.

* * * * *

UNITED STATES PATENT AND TRADEMARK OFFICE
CERTIFICATE OF CORRECTION

| | |
|---|---|
| PATENT NO. | : 8,584,015 B2 |
| APPLICATION NO. | : 13/110863 |
| DATED | : November 12, 2013 |
| INVENTOR(S) | : Robert Van Osten |

It is certified that error appears in the above-identified patent and that said Letters Patent is hereby corrected as shown below:

In the Claims

Column 11, Line 19, Claim 5, add the word --and-- after the phrase "the particular image".

Column 12, Line 7, Claim 12, add the word --the-- after the phrase "regions corresponding to".

Signed and Sealed this
Fourth Day of February, 2014

Michelle K. Lee
*Deputy Director of the United States Patent and Trademark Office*